United States Patent
Best et al.

(10) Patent No.: US 11,868,512 B2
(45) Date of Patent: Jan. 9, 2024

(54) DETECTION OF A NETLIST VERSION IN A SECURITY CHIP

(71) Applicant: CRYPTOGRAPHY RESEARCH, INC., San Jose, CA (US)

(72) Inventors: Scott C. Best, Palo Alto, CA (US); Christopher Leigh Rodgers, Hillsborough, CA (US)

(73) Assignee: CRYPTOGRAPHY RESEARCH, INC., San Jose, CA (US)

( * ) Notice: Subject to any disclaimer, the term of this patent is extended or adjusted under 35 U.S.C. 154(b) by 8 days.

(21) Appl. No.: 17/636,831

(22) PCT Filed: Sep. 4, 2020

(86) PCT No.: PCT/US2020/049505
§ 371 (c)(1),
(2) Date: Feb. 18, 2022

(87) PCT Pub. No.: WO2021/046420
PCT Pub. Date: Mar. 11, 2021

(65) Prior Publication Data
US 2022/0269827 A1 Aug. 25, 2022

Related U.S. Application Data

(60) Provisional application No. 62/897,177, filed on Sep. 6, 2019.

(51) Int. Cl.
*G06F 21/40* (2013.01)
*G06F 21/76* (2013.01)

(52) U.S. Cl.
CPC .................................. *G06F 21/76* (2013.01)

(58) Field of Classification Search
CPC ....................................................... G06F 21/76
USPC ........................................................... 726/34
See application file for complete search history.

(56) References Cited

U.S. PATENT DOCUMENTS

| 8,476,920 | B2 | 7/2013 | Brown et al. |
| 9,413,356 | B1 * | 8/2016 | McKinley ........ H03K 19/17768 |
| 9,536,112 | B2 | 1/2017 | Neo et al. |
| 10,184,980 | B2 | 1/2019 | Maheshwari et al. |

(Continued)

OTHER PUBLICATIONS

Encarnacion Castillo et al. "Digital Signature Embedding Technique for IP Core Protection" 2007 IEEE 2007, pp. 143-148. 6 pages.

(Continued)

*Primary Examiner* — Michael S McNally
(74) *Attorney, Agent, or Firm* — Lowenstein Sandler LLP

(57) ABSTRACT

A pattern detector circuit is provided in a security chip, wherein the pattern detector circuit monitors accesses of a plurality of configuration registers, each of the plurality of configuration registers having a corresponding address. In response to receiving from a host a predefined sequence of accesses of the plurality of configuration registers for one or more operations to the plurality of configuration registers, a processor in the pattern detector circuit determines a value indicative of a current version of a netlist for the security chip. The determined value is made available to be obtained by a read operation by the host at a specific configuration register address.

20 Claims, 4 Drawing Sheets

(56) References Cited

U.S. PATENT DOCUMENTS

| | | | | |
|---|---|---|---|---|
| 2006/0059345 A1* | 3/2006 | Fayad | ............... | G06F 21/72 |
| | | | | 713/173 |
| 2007/0247936 A1* | 10/2007 | Direnzo | ............ | G06F 12/0284 |
| | | | | 365/200 |
| 2008/0154251 A1* | 6/2008 | Stuart | ............... | A61B 18/203 |
| | | | | 606/13 |

OTHER PUBLICATIONS

Fujun Bai et al., "A Watermarking Technique for Hard IP Protection in Full-custom IC Design," 2007 International Conference on Communications, Circuits and Systems, Kokura, 2007, pp. 1177-1180. doi: 10.1109/ICCCAS.2007.4348256. 4 pages.

Moritz Schmid et al., "Netlist-Level IP Protection by Watermarking for LUT-Based FPGAs", 978-1-4244-2796-3/08/$25.00 © 2008 IEEE. 8 pages.

Notification of Transmittal of the International Search Report and the Written Opinion of the International Searching Authority, or the Declaration dated Dec. 10, 2020 re: Int'l Appl. No. PCT/US2020/049505. 10 Pages.

* cited by examiner

DETECTION OF A NETLIST VERSION IN A SECURITY CHIP

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure are directed to monitoring an intended hardware configuration in a security chip that is physically connected to a consumable device or an article which is functionally coupled to an appliance. The security chip communicates with a host processor in the appliance, and the host can read a value indicative of a current version of netlist in the security chip if a plurality of configuration registers in the security chip are accessed in a correct sequence, as detected by a pattern detector circuit in the security chip. The host processor within the appliance may communicate with the security chip for a variety of reasons, including but not limited to configuring the operation of the consumable device, confirming the operational readiness of the consumable device, ensuring that the consumable device is compatible with the appliance, etc.

A netlist textually describes interconnection between various hardware components to be implemented in a chip. For example, in case of a circuit built with a plurality of logic gates, the netlist describes the logical gate instances and the connections between them. In essence, a netlist is a fingerprint of the hardware design version used in a particular chip. When a chip contains a functional error within the netlist, it is often more economical to update the host software to work around the error with specialized software, rather than update the chip to repair the error. When there are many possible versions of a chip that the host software needs to be compatible with, it is useful to provide the host with a netlist version value, so that the software can correctly interact with the chip. In the case of a security chip, however, revealing the netlist version value to an adversary could help facilitate an attack. The challenge is to provide a means by which a host can readily obtain the current version of the netlist from a security chip in the consumable device to the host, while at the same time obscuring that value from potential adversaries.

Aspects of this disclosure address the above and other challenges by providing a pattern detector circuit in the security chip attached to the consumable device that monitors the host's interaction with the security chip. The pattern detector circuit in a security chip can detect a target pattern (e.g., a correct sequence of access of a plurality of configuration registers) and generate a target value based on the target pattern. A specific configuration register can be updated with the target value that indicates the netlist-version value. When the host reads the netlist-version value at the specific configuration register, the host processor within the appliance can correctly interact with the security chip within then consumable device.

Figure 1:
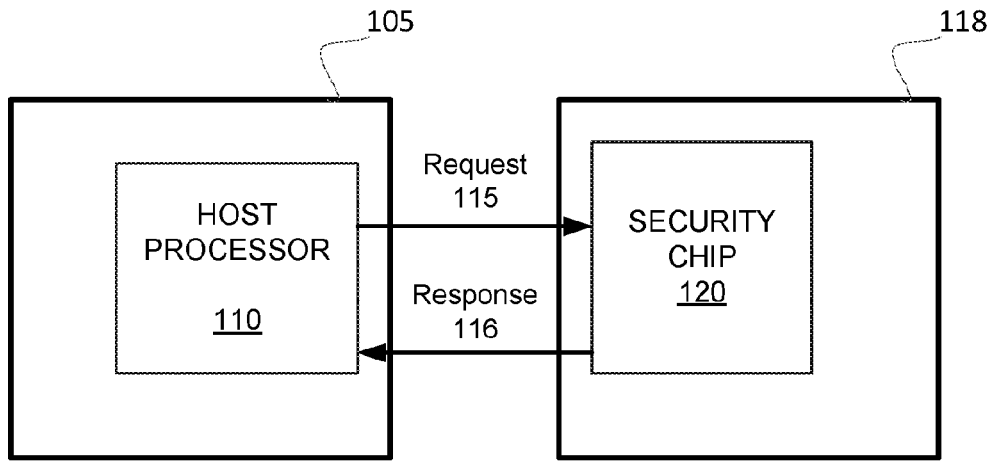
FIG. 1 is a block diagram of the key functional components of a system where a host processor within an appliance communicates with a consumable device containing a security chip, in accordance with some embodiments of the present disclosure.

FIG. 1 illustrates the main components of system having an appliance 105 and a consumable device 118, in accordance with some aspects of the present disclosure. A host processor 110 in the appliance 105 sends a read request 115 to an interface circuit of a security chip 120 attached to the consumable device 118, and receives a response 116. Security chip 120 may generate a netlist-version string by a special circuit (such as a pattern detector circuit 230 shown in FIG. 2) when certain conditions are met. Host processor 110 may be implemented as a standalone chip or as software executed by a processor in a host (e.g., a central processing unit (CPU) of the host, or an application processor). Based on the received response 116, host processor 110 can, in an embodiment, determine the netlist version of the security chip and adjust its software execution accordingly.

Figure 2:
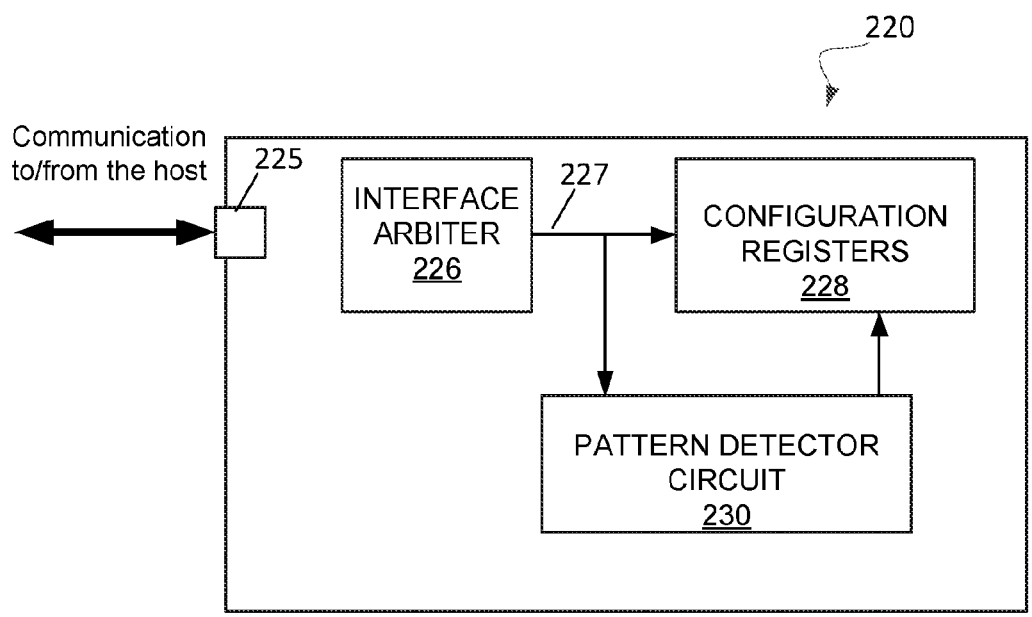
FIG. 2 is an example implementation of a security chip, in accordance with an embodiment of the present disclosure.

FIG. 2 illustrates an example implementation of an interface circuit of a security chip 220. As mentioned above, the security chip may be a part of a consumable device that is required to be compatible with a specific host contained within a specific appliance. For example, the consumable device may be an ink cartridge or a toner cartridge for a printer that houses the host. In another example, the consumable device may be a disposable medical sensor (e.g., an ultrasound transducer) for a medical diagnostic equipment that houses the host. In another example, the consumable device may be a rechargeable battery, and the battery recharger houses the host. In another example, the consumable device may be an automotive component (e.g., a headlight assembly, an airbag module, a sensor module, etc.) within an advanced driver assist system that comprises the host. In each of these embodiments, the host may need to adjust its interaction with the security chip, depending on the netlist version of the security chip disposed on the consumable device.

Security chip 220 may have an interface arbiter 226 for handling communication with the host using a specific communication protocol, such as inter-integrated-circuit ($I^2C$) protocol. Interface arbiter 226 may receive communication from the host from an electrical interface 225. Interface 225 may be an $I^2C$ interface, which is a synchronous serial computer bus that is used for attaching peripheral ICs to processors and microcontrollers in short distance communication. Interface 225 can handle all communication to/from the host, and route the signals within the security chip via the interface arbiter 226.

Security chip 220 may also have a plurality of configuration registers 228, and each configuration register is associated with a corresponding address. Configuration registers can be programmed during manufacturing with information specific to the consumable device to which it will be attached, e.g., what the model number of the consumable device is. The configuration registers can further be read or written based on host communication. For example, a read request may specify an address of a certain configuration register that has a value pertaining to the operational status of the consumable device (e.g., is the consumable ready for operation, is it busy with an operation, or did a previous operation result in an error). In another example, a reset operation may be initiated by writing to a certain configuration register whose address is specified in the host-initiated request. Interface arbiter 226 may mediate access to one or more configuration registers in a particular sequence. In one embodiment, a value may become readable by the host at a certain configuration register. The value may comprise a binary string that indicates a netlist version. The binary string is referred to as a "netlist-version string," as described below.

Security chip 220 also includes a pattern detector circuit 230. Pattern detector circuit 230 is coupled to the plurality of configuration registers 228. Pattern detector circuit 230 receives as an input the signal 227 between interface arbiter 226 and the configuration registers 228. This implies that the pattern detector circuit 230 can monitor access traffic between interface arbiter 226 and the configuration registers 228, looking for a predetermined sequence that generates a target pattern. If a target pattern in the traffic between interface arbiter 226 and the configuration registers 228 is matched, a special configuration register can be updated with a specific value. For example, if three configuration registers, A, B, and C are accessed in the correct sequence in accordance with the protocol in use, the pattern detector circuit updates a configuration register D with a specific value ("netlist-version string") indicating the correct netlist-version. However, as shown in the examples in Table I below, if the sequence of access is different, then the configuration register D is updated with a string of zeroes, referred to as 0-string, or, a string different than the correct netlist-version string (e.g., a string of random or pseudorandom values). In other embodiments, in addition to monitoring the address pattern associated with the access, the pattern detector circuit will additionally monitor for read or write operations for each access. For example, if three configuration registers, A, B, and C are accessed in the correct predetermined sequence and with the correct predetermined read or write operation, the pattern detector circuit updates a configuration register D with a specific value ("netlist-version string") indicating the correct netlist-version.

Pattern detector circuit 230 comprises a processor or processing circuit (not shown) that can calculate or otherwise provide the netlist-version string or the 0-string based on a matching or not-matching sequence of access of the plurality of configuration registers, using a pattern matching algorithm. Note while the examples herein uses 4 registers A thru D, in practice the plurality of configuration registers is much larger, typically at least between 8 and 32 registers. Via this approach, the netlist-version string may be readily obtained by a processing host which requires the value (e.g., to configure its software execution), while at the same time obscuring the value from potential security adversaries.

TABLE I

Value at a Specific Configuration Register Address Based on Sequence of Accesses of a Plurality of Configuration Registers

| Sequence of accessing configuration registers | Value at configuration register D |
|---|---|
| Read A, write B, read A, read C, read D | Correct netlist-version string |
| Read A, read B, read A, read C, read D | 0-string |
| Read A, write B, write A, read C, read D | 0-string |
| Read A, write B, read A, write C, read D | 0-string |
| Write A, write B, read A, read C, read D | 0-string |

Figure 3:
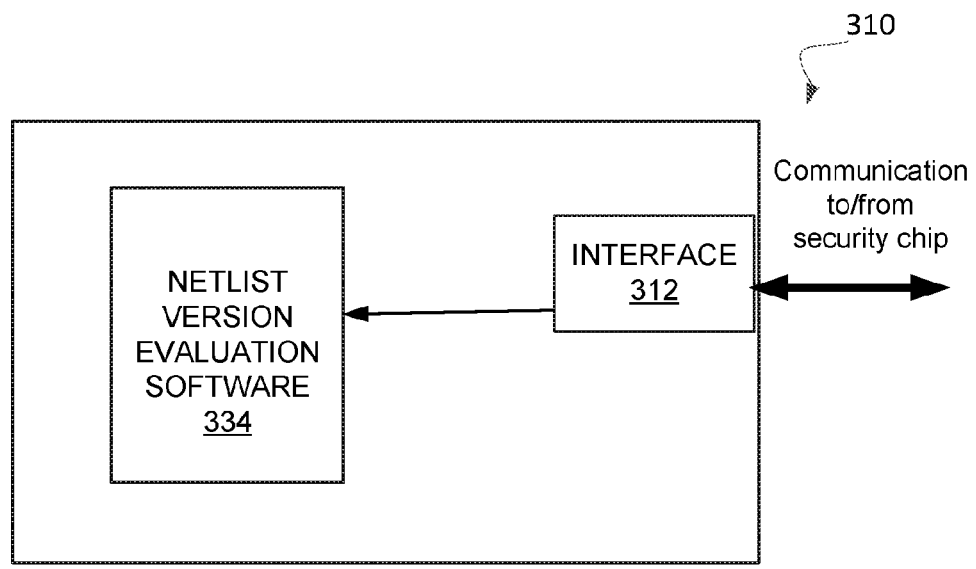
FIG. 3 is an example implementation of an evaluation module in a host processor within an appliance, in accordance with an embodiment of the present disclosure.

FIG. 3 illustrates an example implementation of an evaluation module 310 in a host. The evaluation module 310 may have an interface 312 to send requests (e.g., a request to read data loaded at a particular configuration register address) to a security chip, and to receive responses from the security chip. Evaluation module 310 may have (or cause to be executed within a processing host) netlist-version evaluation software 334, which, when executed by a processor, is configured to issue a sequence of configuration register operations that will obtain the netlist-version value from the security chip.

Figure 4:
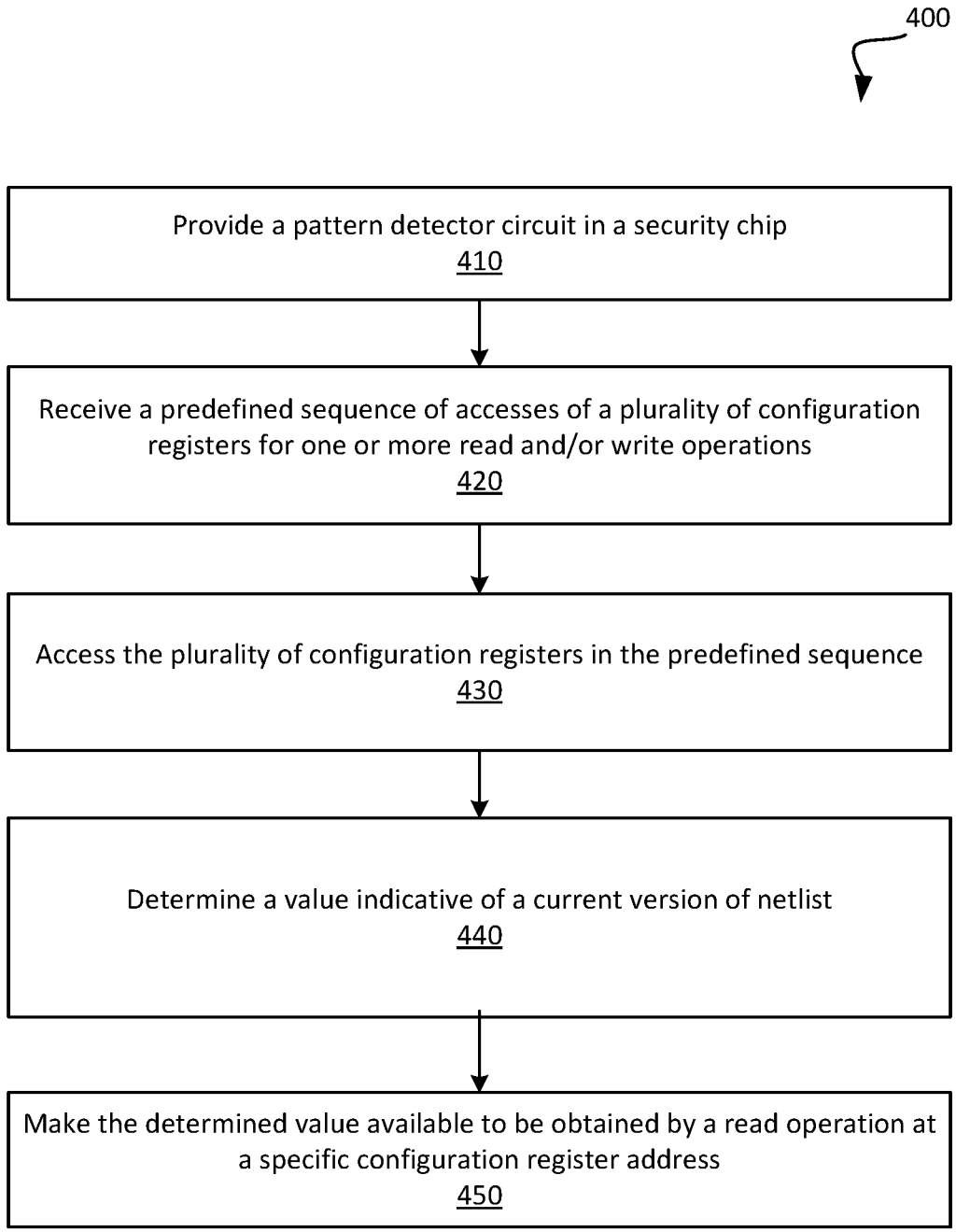
FIG. 4 is a flow diagram of an example method describing operations of a security chip with a pattern detector circuit, in accordance with some embodiments of the present disclosure.

FIG. 4 is a flow diagram of an example method 400 performed by a security chip during a configuration register access process, in accordance with some aspects of the present disclosure. The method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 may be performed by various components of the security chip 220 shown in FIG. 2.

At operation 410, a pattern detector circuit is provided in a security chip. The pattern detector circuit may be a logic circuit described in FIG. 2 as element 230. In some embodiments, the pattern detector circuit may be a modified version of a communication protocol monitoring circuit, i.e. the communication protocol monitoring circuit may be modified by including a pattern detection logic circuit.

At operation 420, the security chip receives a predefined sequence of accesses of a plurality of configuration registers for one or more operations to the plurality of configuration registers. The one or more operations may be read operation only, write operation only or a combination of read and write operations. In the example embodiment shown in FIG. 2, the sequence of access is received by interface 225 that routes the request to interface arbiter 226. The sequence of accesses may depend on the communication protocol (e.g., I²C protocol).

At operation 430, the plurality of configuration registers are accessed in the predefined sequence. In an embodiment, interface arbiter 226 shown in FIG. 2 may manage the sequence of accesses of the configuration registers 228, whose addresses are specified in the incoming request.

At operation 440, a processing circuit in the pattern detector circuit calculates or otherwise provides a value that indicates a current version of the netlist. This value, referred to as the netlist-version string, is calculated based on the sequence of accesses of various configuration registers.

At operation 450, the calculated value is made available to be obtained by the host by a read operation at a specific configuration register address. For example, as shown in the Table I, if configuration registers A, B, and C are accessed in a certain sequence and with certain read/write operations, the correct netlist-version string will be available via a read of configuration register D, which can be obtained by the host.

Persons skilled in the art will understand that although the flow diagram in FIG. 4 shows a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 5:
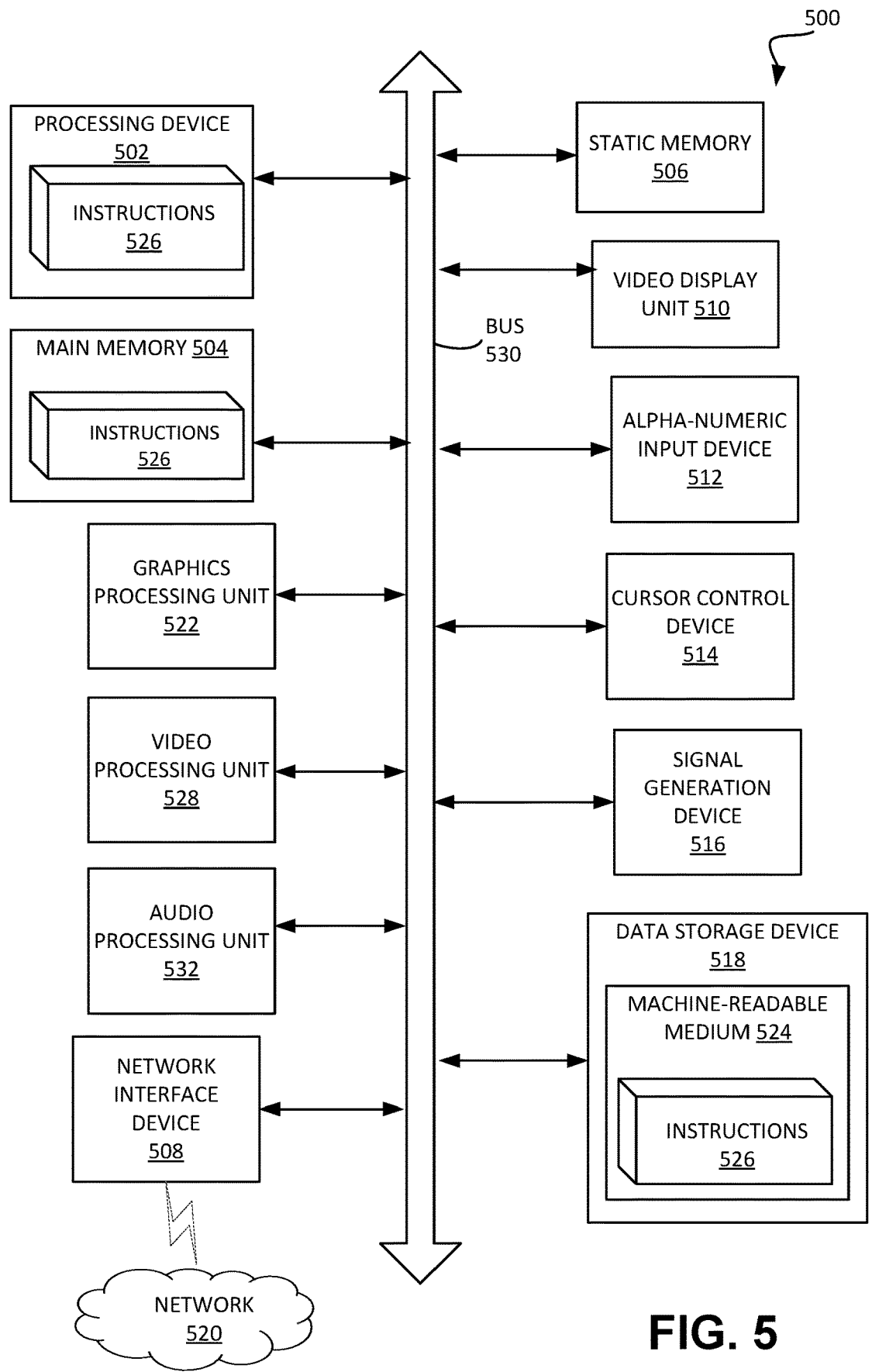
FIG. 5 illustrates a block diagram of a sample computer system in which some embodiments of the disclosure may operate.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530. In one implementation, processing device 502 may be a processor in the pattern detector circuit 230 in FIG. 2.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), video processing unit 528, and audio processing unit 532.

The data storage device 518 may include a machine-readable storage medium 524 (also known as a computer-readable medium) on which is stored one or more sets of instructions or software 526 embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In one implementation, the instructions 526 include instructions to implement functionality of pattern detector circuit 230 in FIG. 2. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
providing a pattern detector circuit in a security chip, wherein the pattern detector circuit monitors accesses of a plurality of configuration registers, each of the plurality of configuration registers having a corresponding address;
in response to receiving from a host a predefined sequence of accesses of the plurality of configuration registers for one or more operations to the plurality of configuration registers, determining, by a processing circuit in the pattern detector circuit, a value indicative of a current version of a netlist for the security chip; and
making the determined value available to be obtained by a read operation by the host at a specific configuration register address.

2. The method of claim 1, wherein the predefined sequence of accesses received from the host includes both read and write operations to the plurality of configuration registers.

3. The method of claim 1, wherein the predefined sequence of accesses received from the host comprises only read operations to the plurality of configuration registers.

4. The method of claim 1, wherein the predefined sequence of accesses received from the host comprises only write operations to the plurality of configuration registers.

5. The method of claim 1, wherein the security chip is attached to a consumable device.

6. The method of claim 5, wherein an appliance housing the host communicates with the security chip.

7. The method of claim 6, wherein the consumable device with the current version of netlist is functionally compatible with the appliance.

8. The method of claim 7, wherein the consumable device is a disposable medical sensor, and the appliance is a medical diagnostic equipment.

9. The method of claim 7, wherein the consumable device is a battery, and the appliance is an electronic device where the battery can be inserted.

10. The method of claim 7, wherein the consumable device is a cartridge, and the appliance is a printer where the cartridge can be inserted.

11. The method of claim 7, wherein the consumable device is an automotive component within a driver assistance system that comprises the host.

12. A security chip comprising:
a plurality of configuration registers, each of the plurality of configuration registers having a corresponding address;
an interface circuit that is configured to receive from a host a predefined sequence of accesses of the plurality of configuration registers for one or more operations to the plurality of configuration registers; and
a pattern detector circuit operationally coupled to both the interface circuit and the configuration registers, wherein the pattern detector circuit is configured to monitor accesses of the plurality of configuration registers and wherein, in response to receiving the predefined sequence of accesses, a processing circuit in the pattern detector circuit is configured to: determine a value indicative of a current version of a netlist for the security chip, and, make the determined value available to be obtained by a read operation by the host at a specific configuration register address.

13. The security chip of claim 12, wherein the predefined sequence of accesses received from the host includes both read and write operations to the plurality of configuration registers.

14. The security chip of claim 12, wherein the predefined sequence of accesses received from the host comprises only read operations to the plurality of configuration registers.

15. The security chip of claim 12, wherein the predefined sequence of accesses received from the host comprises only write operations to the plurality of configuration registers.

16. The security chip of claim 12, wherein the security chip is attached to a consumable device.

17. The security chip of claim 16, wherein an appliance housing the host communicates with the security chip.

18. The security chip of claim 17, wherein the consumable device with the current version of netlist is functionally compatible with the appliance.

19. The security chip of claim 18, wherein the consumable device is a disposable medical sensor, and the appliance is a medical diagnostic equipment.

20. The security chip of claim 18, wherein the consumable device is a cartridge, and the appliance is a printer where the cartridge can be inserted.

* * * * *